(12) United States Patent
Uegaki et al.

(10) Patent No.: US 11,062,822 B2
(45) Date of Patent: Jul. 13, 2021

(54) COMMUNICATION CABLE

(71) Applicants: AUTONETWORKS TECHNOLOGIES, LTD., Yokkaichi (JP); SUMITOMO WIRING SYSTEMS, LTD., Yokkaichi (JP); SUMITOMO ELECTRIC INDUSTRIES, LTD., Osaka (JP)

(72) Inventors: Ryoma Uegaki, Yokkaichi (JP); Kinji Taguchi, Yokkaichi (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 16/472,304

(22) PCT Filed: Dec. 21, 2017

(86) PCT No.: PCT/JP2017/045859
§ 371 (c)(1),
(2) Date: Jun. 21, 2019

(87) PCT Pub. No.: WO2018/117204
PCT Pub. Date: Jun. 28, 2018

(65) Prior Publication Data
US 2020/0251249 A1    Aug. 6, 2020

(30) Foreign Application Priority Data

Dec. 21, 2016    (JP) .............................. JP2016-247767

(51) Int. Cl.
*H01B 7/18*    (2006.01)
*B60R 16/02*    (2006.01)
(Continued)

(52) U.S. Cl.
CPC ............... *H01B 7/18* (2013.01); *B60R 16/02* (2013.01); *H01B 11/08* (2013.01); *H01B 11/12* (2013.01)

(58) Field of Classification Search
CPC ... H01B 7/02; H01B 7/04; H01B 7/06; H01B 7/08; H01B 7/18; H01B 9/02; H01B 9/08; H01B 11/12; H01B 11/08
(Continued)

(56) References Cited

U.S. PATENT DOCUMENTS 4,506,235 A * 3/1985 Mayer .................. H01B 11/146
174/36
5,597,981 A * 1/1997 Hinoshita .............. H01B 7/295
174/110 PM
(Continued)

FOREIGN PATENT DOCUMENTS

JP        06-60740 A  *  3/1994  ............. H01B 11/02
JP    H06-060740 A      3/1994
(Continued)

OTHER PUBLICATIONS

Jan. 23, 2018 International Search Report issued in International Patent Application No. PCT/JP2017/045859.
Apr. 27, 2021 Office Action issued in U.S. Appl. No. 17/024,893.

*Primary Examiner* — William H. Mayo, III
(74) *Attorney, Agent, or Firm* — Oliff PLC

(57) ABSTRACT

A communication cable that includes a twisted wire pair that includes a pair of insulated wires that are twisted together and that each include a conductor and an insulating covering that covers an outer periphery of the conductor; and a sheath that is made of an insulating material and continuously covers an entire outer periphery of the twisted wire pair about a center along a longitudinal axis of the twisted wire
(Continued)

pair, wherein the sheath has a dielectric loss tangent of 0.0001 or more in a frequency range of 1 to 50 MHz.

5 Claims, 2 Drawing Sheets

(51) Int. Cl.
*H01B 11/08* (2006.01)
*H01B 11/12* (2006.01)

(58) Field of Classification Search
USPC .................. 174/110 R, 113 R, 120 R, 121 R
See application file for complete search history.

(56) References Cited

U.S. PATENT DOCUMENTS

| | | | |
|---|---|---|---|
| 6,242,097 B1* | 6/2001 | Nishiguchi | B32B 27/08 |
| | | | 428/383 |
| 7,507,909 B2 | 3/2009 | Federighi et al. | |
| 8,981,216 B2 | 3/2015 | Grant et al. | |
| 2011/0315419 A1* | 12/2011 | Grant | H01B 11/06 |
| | | | 174/34 |
| 2012/0298400 A1* | 11/2012 | Hinoshita | H01B 7/29 |
| | | | 174/113 R |
| 2013/0092437 A1 | 4/2013 | Yoshinaga | |
| 2015/0144375 A1* | 5/2015 | Hashimoto | H01B 3/441 |
| | | | 174/113 R |

FOREIGN PATENT DOCUMENTS

| | | |
|---|---|---|
| JP | H08-050820 A | 2/1996 |
| JP | H09-092050 A | 4/1997 |
| JP | 2005-032583 A | 2/2005 |

* cited by examiner

COMMUNICATION CABLE

This application is the U.S. National Phase of PCT/JP2017/045859 filed Dec. 21, 2017, which claims priority to JP 2016-247767 filed Dec. 21, 2016, the entire disclosure of which is incorporated herein by reference.

BACKGROUND

The present disclosure relates to a communication cable, and more specifically to a communication cable that can be used for high-speed communication in automobiles or the like.

The demand for high-speed communication has been increasing in the automotive and other sectors. Cables that are used for high-speed communication are required to satisfy predetermined levels of various transmission characteristics such as the characteristic impedance. For example, JP 2005-32583A discloses a shielded communication cable that includes a twisted wire pair obtained by twisting together a pair of insulated core wires each including a conductor and an insulator covering the conductor, a metal foil shield as a shield covering the twisted wire pair, an earth wire conductively connected to the metal foil shield, and a sheath covering the entirety of these. This shielded communication cable has a characteristic impedance of 100±10 2.

SUMMARY

Communication cables that are used in automobiles or the like are required to satisfy predetermined levels of not only the characteristic impedance but also various transmission characteristics. Such transmission characteristics include mode conversion characteristics such as a transmission mode conversion characteristic and a reflection mode conversion characteristic. According to the knowledge of the inventors of the present disclosure, the mode conversion characteristics of a communication cable largely depend on physical properties of polymer materials constituting the communication cable, such as its insulating covering and sheath.

An exemplary aspect of the disclosure provides a communication cable that has excellent mode conversion characteristics.

A communication cable according to the present disclosure includes a twisted wire pair that includes a pair of insulated wires that are twisted together and that each include a conductor and an insulating covering that covers an outer periphery of the conductor, and a sheath that is made of an insulating material and covers an outer periphery of the twisted wire pair, wherein the sheath has a dielectric loss tangent of 0.0001 or more.

Preferably, the dielectric loss tangent of the sheath is 0.08 or less. Preferably, the dielectric loss tangent of the sheath is larger than a dielectric loss tangent of the insulating covering. Preferably, the sheath includes an outer layer and an inner layer that is disposed inside the outer layer, and a dielectric loss tangent of the outer layer is larger than a dielectric loss tangent of the inner layer.

In the above-described communication cable according to the present disclosure, the dielectric loss tangent of the sheath covering the outer periphery of the twisted wire pair is 0.0001 or more. As a result of the sheath having a large dielectric loss tangent, coupling between the twisted wire pair and a ground potential of the surrounding of the communication cable can be effectively attenuated by dielectric loss at the sheath. As a result, a high level of transmission mode conversion such as 46 dB or more can be achieved.

If the dielectric loss tangent of the sheath is 0.08 or less, it is possible to suppress attenuation of signals transmitted through the communication cable and it is easy to avoid communication failure caused by attenuation of signals.

If the dielectric loss tangent of the sheath is larger than a dielectric loss tangent of the insulating covering, it is easy to achieve both reduction of coupling with the ground potential and suppression of signal attenuation in the communication cable.

If the sheath includes an outer layer and an inner layer disposed inside the outer layer, and a dielectric loss tangent of the outer layer is larger than a dielectric loss tangent of the inner layer, coupling with the ground potential can be effectively attenuated as a result of the outer layer, which is located further away from the twisted wire pair, being made of a material having a large dielectric loss tangent. On the other hand, as a result of the inner layer located closer to the twisted wire pair being made of a material having a small dielectric loss tangent, attenuation of signals transmitted through the twisted wire pair can be suppressed.

DETAILED DESCRIPTION OF EMBODIMENTS

The following describes a communication cable according to one embodiment of the present disclosure in detail with reference to the drawings.

Configuration of Communication Cable

Figure 1:
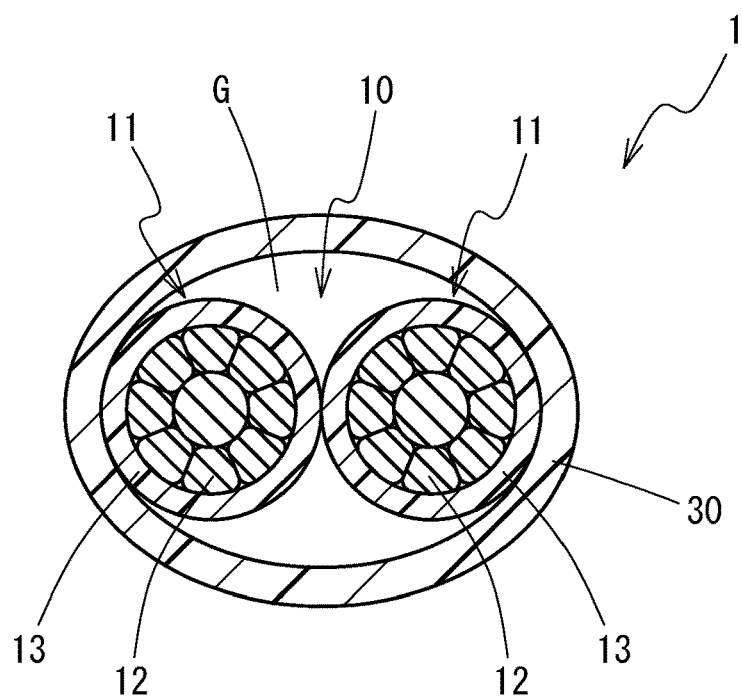
FIG. 1 is a cross-sectional view of a communication cable according to one embodiment of the present disclosure.

FIG. 1 is a cross-sectional view of a communication cable 1 according to one embodiment of the present disclosure.

The communication cable 1 includes a twisted wire pair 10 that is obtained by twisting together a pair of insulated wires 11 and 11. Each insulated wire 11 includes a conductor 12 and an insulating covering 13 that covers an outer periphery of the conductor 12. The communication cable 1 further includes a sheath 30 that is made of an insulating material and covers an outer periphery of the entire twisted wire pair 10. The communication cable 1 is capable of transmitting differential mode signals through the twisted wire pair 10, and is used for, for example, high-speed communication in automobiles or the like.

Unlike the communication cable disclosed in Patent Document 1, the communication cable 1 of the present embodiment does not include a shield that is made of a conductive material and surrounds the twisted wire pair 10 inside the sheath 30, and the sheath 30 directly surrounds the outer periphery of the twisted wire pair 10. Although the shield serves to shield the twisted wire pair 10 from noise that would otherwise enter from the outside or would otherwise be emitted to the outside, the communication cable 1 of the present embodiment is intended to be used under conditions where the influence of noise is not serious, and therefore the shield is not provided. However, a shield may be provided inside sheaths 30, 30A, 30B in the present embodiment and variations described later.

(1) Configuration of Sheath

The sheath 30 is provided to protect the twisted wire pair 10 and maintain its twist structure, for example. Particularly, if the communication cable 1 is used in an automobile, the communication cable 1 needs to be protected from the influence of moisture, and the sheath 30 serves to prevent various characteristics of the communication cable 1 from being affected by contact with moisture.

In the embodiment of FIG. 1, the sheath 30 is formed as a loose jacket and has a tube-like shape accommodating the twisted wire pair 10 inside it. The inner peripheral surface of the sheath 30 is in contact with the insulated wires 11 constituting the twisted wire pair 10 in only some regions in the circumferential direction, and in the other regions, there is a void G forming a layer of air between the sheath 30 and the insulated wires 11. In the configuration shown in FIG. 1, the sheath 30 is constituted by a single layer.

(1-1) Material of Sheath

The sheath 30 is made of a polymer material as a main component. The polymer material of the sheath 30 may be any polymer material. Specific examples of polymer materials include polyolefins such as polyethylene and polypropylene, polyvinyl chloride, polystyrene, polytetrafluoroethylene, and polyphenylene sulfide. Further, the sheath 30 may contain an additive such as a flame retardant in addition to the polymer material, as appropriate.

The material of the sheath 30 has a dielectric loss tangent of 0.0001 or more. Note that, in the present specification, properties of materials such as dielectric loss tangent, dielectric constant, and the like are defined with respect to a frequency of communication to which the communication cable 1 is applied, which is in a frequency range of 1 to 50 MHz, for example, and are values measured at room temperature in the atmosphere.

Dielectric loss at the sheath 30 increases with an increase in the dielectric loss tangent of the material of the sheath 30, and therefore common mode noise caused by coupling between the twisted wire pair 10 and a ground potential outside the communication cable 1 can be attenuated. As a result, a mode conversion characteristic of the communication cable 1 can be improved. Here, the mode conversion characteristic means a transmission mode conversion characteristic (LCTL) or a reflection mode conversion characteristic (LCL), and particularly the transmission mode conversion characteristic. A mode conversion characteristic is an index that indicates a degree of conversion between a differential mode and a common mode of signals transmitted through the communication cable 1. The larger the value (absolute value) of the mode conversion characteristic is, the more unlikely conversion between the modes occurs.

It is desirable that a communication cable 1 as described above that is used in automobiles or the like satisfies LCTL≥46.0 dB (50 MHz) and LCL≥46.0 dB (50 MHz). If the sheath 30 has a dielectric loss tangent of 0.0001 or more, a communication cable 1 having excellent mode conversion characteristics satisfying the above-described level can be easily achieved. If the dielectric loss tangent is 0.0006 or more, the mode conversion characteristics can be further improved. If the communication cable 1 is used in an automobile, for example, a member that serves as the ground potential such as a vehicle body is often disposed in the vicinity of the communication cable 1, so that it is effective to increase the dielectric loss tangent of the sheath 30 to reduce noise.

On the other hand, an excessively large dielectric loss tangent of the material of the sheath 30 increases attenuation of a differential mode signal transmitted through the twisted wire pair 10, which may result in communication failure. The influence of signal attenuation can be suppressed if the dielectric loss tangent of the sheath 30 is 0.08 or less, or 0.01 or less, for example.

The dielectric loss tangent of the sheath 30 can be adjusted by changing the polymer material and an additive such as a flame retardant constituting a sheath material and the amount of the additive, for example. For example, the dielectric loss tangent of the sheath 30 can be increased by using a polymer material that has a high molecular polarity. This is because a polymer material that has a high molecular polarity and a high dielectric constant typically has a large dielectric loss tangent. The dielectric loss tangent of the sheath 30 can also be increased by adding an additive that has a high polarity. The dielectric loss tangent can be further increased by increasing the amount of such an additive.

Incidentally, if the diameter of the entire communication cable 1 as described above is reduced by reducing the diameter of the insulated wire 11 and the thickness of the sheath 30, it is sometimes difficult to achieve a required characteristic impedance. Accordingly, it can be considered to increase the characteristic impedance by reducing an effective dielectric constant of the communication cable 1 defined by the following formula (1). From this standpoint, it is preferable to use a polymer material that has a low molecular polarity and gives a low dielectric constant as the polymer material of the sheath 30.

[Formula 1]

$$Z_0 = \frac{\eta_0}{\pi\sqrt{\varepsilon_{e\!f\!f}}}\cosh^{-1}\left(\frac{D}{d}\right) \qquad (1)$$

Here, $\varepsilon_{e\!f\!f}$ represents the effective dielectric constant, d represents the diameter of the conductor, D represents the outer diameter of the cable, and $\eta_0$ represents a constant.

Further, the communication cable 1 may be exposed to high temperatures in an in-vehicle environment or the like, and therefore a polymer material having a lower molecular polarity is also preferable as the polymer material of the sheath 30 from the standpoint of preventing a situation in which the characteristic impedance of the communication cable 1 decreases due to the dielectric constant of the sheath 30 largely increasing at high temperatures. Particularly, a nonpolar polymer material is preferably used as a polymer material having a low molecular polarity. Out of the above-listed various polymer materials, polyolefins are nonpolar polymer materials.

As described above, it is desirable that the sheath 30 has a large dielectric loss tangent, which is a parameter that tends to increase as the molecular polarity of the polymer material increases, whereas it is desirable that the polymer material of the sheath 30 has a low molecular polarity from a different standpoint. Therefore, the dielectric loss tangent of constituent materials of the sheath 30 as a whole can be increased by adding an additive that has a polarity that increases the dielectric loss tangent to a polymer material that does not have molecular polarity, such as polyolefins, or has a low molecular polarity.

Further, the dielectric loss tangent of the material of the sheath 30 is preferably equal to or more than the dielectric loss tangent of the material of the insulating covering 13 of the insulated wire 11, and more preferably more than the dielectric loss tangent of the insulating covering 13. This is because it is preferable that the sheath 30 has a large dielectric loss tangent from the standpoint of improving the mode conversion characteristics as described above, whereas it is preferable that the insulating covering 13 has a small dielectric loss tangent from the standpoint of suppressing the influence of attenuation of a differential mode signal transmitted through the twisted wire pair 10, for example. The dielectric loss tangent of the sheath 30 is preferably 1.5 times or more of the dielectric loss tangent of the insulating covering 13, more preferably 2 times or more, and further preferably 5 times or more, for example.

The polymer material of the sheath 30 may be foamed or not foamed. The polymer material is preferably foamed from the standpoint of, by the effect of air being held in foamed portions, reducing the dielectric constant of the sheath 30 to increase the characteristic impedance of the communication cable 1, for example. On the other hand, the polymer material is preferably not foamed from the standpoint of stabilizing transmission characteristics of the communication cable 1 by preventing variation in the transmission characteristics, which may be caused by variation in the degree of foaming. In terms of productivity of the sheath 30, it is more convenient not to foam the sheath 30 because a foaming process can be omitted, but it is more convenient to foam the sheath 30 from the standpoint that the dielectric constant of the sheath 30 can be reduced with no void G being provided (that is, a configuration corresponding to a solid jacket described later being employed) or the size of a void G being reduced.

(1-2) Preferable Shape of Sheath

In the configuration of FIG. 1, the sheath 30 is provided as a loose jacket as described above. The characteristic impedance of the communication cable 1 increases if the twisted wire pair 10 is surrounded by a material having a low dielectric constant (see formula (1)), and accordingly the characteristic impedance can be increased with the configuration of a loose jacket including a layer of air around the twisted wire pair 10 compared to the configuration of a solid jacket (see FIG. 2) in which a dielectric is located directly adjacent to the outer side of the twisted wire pair 10. Accordingly, if the loose jacket-type sheath 30 is used, a sufficiently high characteristic impedance can be easily achieved even when the thickness of the insulating covering 13 of the insulated wires 11 is reduced. By reducing the thickness of the insulating covering 13, the diameter of the insulated wire 11 can be reduced, and consequently the outer diameter of the entire communication cable 1 can be reduced. Also, compared to the use of a solid jacket-type sheath, the use of the loose jacket-type sheath 30 can reduce the amount of the material of the sheath and consequently can reduce the mass of the communication cable 1 per unit length.

Further, compared to a case where the sheath is provided as a solid jacket, in the case where the sheath 30 is provided as a loose jacket and there is a void G between the sheath 30 and the insulated wires 11, fusion between the sheath 30 and the insulating coverings 13 of the insulated wires 11 can be easily suppressed during formation of the sheath 30, for example. As a result, the sheath 30 can be easily peeled off when an end of the communication cable 1 is processed, for example. Fusion between the sheath 30 and the insulating coverings 13 is likely to occur particularly if the sheath 30 and the insulating coverings 13 are made of the same type of polymer material.

As the size of the void G between the sheath 30 and the insulated wires 11 increases, the effective dielectric constant (see formula (1)) decreases and the characteristic impedance of the communication cable 1 increases. In a cross section of the communication cable 1 substantially perpendicular to its axis, if the ratio of an area (outer peripheral area ratio) of the void G to an area of the whole region surrounded by an outer peripheral edge of the sheath 30, which is the cross-sectional area of the region including the sheath 30, is 8% or more, there is a sufficiently thick layer of air around the twisted wire pair 10, and accordingly a required characteristic impedance can be easily achieved. The outer peripheral area ratio of the void G is more preferably 15% or more. On the other hand, if the ratio of the area of the void G is too large, the twisted wire pair 10 tends to be displaced in the interior space of the sheath 30 and the twist structure of the twisted wire pair 10 tends to become loose. These phenomena lead to variation or temporal changes in various transmission characteristics such as the characteristic impedance of the communication cable 1. From the standpoint of suppressing these, the outer peripheral area ratio of the void G is preferably 30% or less, and more preferably 23% or less.

The thickness of the sheath 30 can be appropriately selected. For example, the thickness of the sheath is set to 0.20 mm or more, and more preferably 0.30 mm or more from the standpoint of suppressing the influence of noise from the outside of the communication cable 1, such as the influence of other cables when the communication cable 1 is used together with the other cables in the form of a wire harness or the like, and also from the standpoint of achieving mechanical characteristics of the sheath 30 such as the wear resistance and the impact resistance. On the other hand, the thickness of the sheath 30 is set to 1.0 mm or less, and more preferably 0.7 mm or less to reduce the effective dielectric constant and reduce the diameter of the entire communication cable 1.

(3) Configuration of Insulated Wire

As described above, the insulated wires 11 constituting the twisted wire pair 10 each include the conductor 12 and the insulating covering 13 that covers the outer periphery of the conductor 12. Although the insulated wire 11 and the insulating covering 13 may be made of any material and may have any configuration, preferable materials and configurations will be described below.

(3-1) Conductor

The conductor 12 of the insulated wire 11 may be constituted by any metal wire, but preferably includes a copper wire or a copper alloy wire. Various soft copper wires or hard copper wires can be used as copper alloy wires. Examples of soft copper wires include a copper alloy wire containing Fe and Ti (hereinafter referred to as a copper alloy wire A) and a copper alloy wire containing Fe, P, and Sn (hereinafter referred to as a copper alloy wire B) described below. Examples of hard copper wires include a known Cu—Sn alloy wire containing 0.1 to 1.7% by mass of Sn.

The copper alloy wire A has the following component composition.

Fe: 0.05% by mass or more and 2.0% by mass or less
Ti: 0.02% by mass or more and 1.0% by mass or less
Mg: 0% by mass or more and 0.6% by mass or less (this including compositions not containing Mg)

The remaining portion is Cu and inevitable impurities.

The copper alloy wire B has the following component composition.

Fe: 0.1% by mass or more and 0.8% by mass or less
P: 0.03% by mass or more and 0.3% by mass or less
Sn: 0.1% by mass or more and 0.4% by mass or less
The remaining portion is Cu and inevitable impurities.

The conductor 12 may be constituted by a single strand, but is preferably constituted by a twisted wire that is obtained by twisting together a plurality of (for example, seven) strands from the standpoint of improving bendability, for example. In this case, the strands may be subjected to compression molding after being twisted together to obtain a compressed twisted wire. The outer diameter of the conductor 12 can be reduced by compression molding. If the conductor 12 is constituted by a twisted wire, the conductor may be constituted by a single type of strands or a two or more types of strands. In an example where two or more types of strands are used, the strands include strands made of copper alloys, which are soft copper wires such as the copper alloy wires A and B or hard copper wires such as Cu—Sn alloy wires, and strands made of a metal material other than copper alloys, such as SUS. Also, a single type of strands or a combination of two or more types of strands may be used as copper alloy wires.

The conductor 12 of each insulated wire 11 preferably has a high tensile strength. Preferably, the insulated wire 11 is formed using a metal wire that has a tensile strength of 380 MPa or more, for example. The tensile strength of the conductor 12 is more preferably 400 MPa or more, yet more preferably 440 MPa or more, and further preferably 480 MPa or more.

If the conductor 12 has a high tensile strength such as at least 380 MPa, strength required for a cable used in automobiles or the like can be easily maintained even if the diameter of the conductor 12 is reduced. As a result of reducing the diameter of the conductors 12, the distance between the two conductors 12 and 12 constituting the twisted wire pair 10 decreases. As a result of decreasing the distance between the two conductors 12 and 12, the characteristic impedance of the communication cable 1 increases as shown in formula (1). Although the characteristic impedance decreases with a decrease in the thickness of the insulating covering 13 of the insulated wire 11 constituting the twisted wire pair 10, the required characteristic impedance such as 100±10Ω can be easily achieved in the communication cable 1 of the present embodiment by the effect of the decrease of the distance between the conductors 12 and 12 as the diameter of the conductors is reduced, even if the thickness of the insulating covering 13 is reduced. The diameter (finished diameter) of the communication cable 1 as a whole can be reduced by reducing the thickness of the insulating covering 13 of the insulated wire 11. If the diameter of the communication cable 1 is reduced while a predetermined characteristic impedance being maintained, the communication cable 1 can be favorably used for high-speed communication within a limited space, such as within an automobile.

Although the tensile strength of the conductor 12 can contribute to electrical characteristics such as the characteristic impedance of the communication cable 1, through reduction in the diameter of the conductor 12 as described above, the tensile strength of the conductor 12 itself has substantially no influence on the electrical characteristics of the communication cable 1 if the communication cable 1 can be obtained by using the conductor 12 having a predetermined diameter. For example, the mode conversion characteristics of the communication cable 1 do not depend on the tensile strength of the conductor 12 as shown in the Examples described later.

Reduction in the diameter of the conductor 12 and reduction in the thickness of the insulating covering 13 constituting the insulated wire 11 are effective not only for reduction in the diameter of the communication cable 1 but also for reduction in the weight of the communication cable 1. If the weight of the communication cable 1 is reduced, the weight of the entire vehicle can be reduced when the communication cable 1 is used for communication in an automobile, for example, leading to reduction in fuel consumption of the vehicle.

The conductor 12 preferably has a breaking elongation of at least 7%, and more preferably at least 10%. The tensile strength and breaking elongation can be adjusted by performing thermal treatment on a copper alloy wire, and it is possible to achieve a high breaking elongation such as 7% or more by performing thermal treatment on soft copper wires such as the above-described copper alloy wires A and B. Generally, when a copper alloy is subjected to thermal treatment at a higher temperature, the breaking elongation tends to be improved, but the tensile strength tends to decrease. However, when the above-described copper alloy wires A and B are subjected to thermal treatment, the copper alloy wires can have both a breaking elongation of 7% or more and a tensile strength of 380 MPa or more.

A conductor that has a high tensile strength typically has low toughness and often shows low impact resistance when a force is suddenly applied. However, if the conductor 12 has a high tensile strength such as 380 MPa or more as described above and has a breaking elongation of 7% or more, then the conductor 12 can exhibit high impact resistance even if an impact is applied to the conductor 12 in a process of assembling a wire harness using the communication cable 1 or a process of attaching the wire harness.

Further, if the conductor 12 has a high breaking elongation such as 7% or more, the insulated wire 11 is soft, and therefore when two insulated wires 11 are twisted together to form the twisted wire pair 10, a gap is unlikely to be formed between the two insulated wires 11. Further, the twist structure of the twisted wire pair 10 is stably maintained. Although the characteristic impedance of the communication cable 1 tends to increase as the gap between the two insulated wires 11 becomes large, if the twist structure is stably maintained in a state where the gap is small, the characteristic impedance can be kept from becoming too high and it is easy to stably maintain the characteristic impedance in a required range while suppressing variation.

(3-2) Insulating Covering

The insulating covering 13 of the insulated wire 11 may be made of any insulating polymer material. The insulating covering 13 preferably has a relative dielectric constant of 4.0 or less from the standpoint of achieving a predetermined high characteristic impedance of the communication cable 1. Examples of polymer materials satisfying the above include polyolefins such as polyethylene and polypropylene, polyvinyl chloride, polystyrene, polytetrafluoroethylene, and polyphenylene sulfide. The insulating covering 13 may contain an additive such as a flame retardant in addition to the polymer material, as appropriate.

Similarly to the polymer material of the sheath 30, the polymer material of the insulating covering 13 preferably has a low molecular polarity from the standpoint of reducing the dielectric constant of the insulating covering 13, and particularly, preventing an excessive increase in the dielectric constant even under a high temperature in an in-vehicle environment or the like. Out of the above-listed examples, polyolefins, which are nonpolar polymer materials, are preferably used, for example.

Further, the insulating covering 13 preferably has a small dielectric loss tangent. This is because if the insulating covering 13 has a small dielectric loss tangent, it is possible to suppress the influence of attenuation of a differential mode signal transmitted through the twisted wire pair 10. Further, the thickness of the insulating covering 13 that is necessary to achieve a predetermined characteristic impedance decreases (see formula (1)), and therefore it is possible to reduce the diameter and weight of the insulated wire 11. The dielectric loss tangent of the insulating covering 13 is preferably 0.001 or less, for example. Further, the dielectric loss tangent of the insulating covering 13 is preferably equal to or less than the dielectric loss tangent of the sheath 30, and more preferably less than the dielectric loss tangent of the sheath 30, as described above.

The polymer material of the insulating covering 13 may be foamed or not foamed. The polymer material is preferably foamed from the standpoint of reducing the dielectric constant of the insulating covering 13 to reduce the diameter of the insulated wire 11, and the polymer material is preferably not foamed from the standpoints of stabilizing the transmission characteristics of the communication cable 1 and simplifying the production process of the insulating covering 13.

The polymer material of the insulating covering 13 may be the same type as or a different type from the polymer material of the sheath 30. The same type of material is preferably used from the standpoint of simplifying the configuration of the entire communication cable 1 and the production process. On the other hand, a different type of material is preferably used from the standpoint of selecting physical properties such as the dielectric constant for each of the insulating covering 13 and the sheath 30 with high freedom. Particularly, a difference in dielectric loss tangent between the insulating covering 13 and the sheath 30 can be easily achieved by forming the insulating covering 13 and the sheath 30 using different types of materials. The use of different types of materials is also preferable from the standpoint of suppressing fusion between the sheath 30 and the insulating covering 13, for example, during extrusion of the sheath 30 to make it easy to peel off the sheath 30 from an end portion of the communication cable 1, for example.

In the insulated wire 11, the insulating covering 13 is preferably highly uniform in thickness (insulation thickness) over the perimeter of the conductor 12. That is, the insulating covering preferably has small variation in thickness. In this case, eccentricity of the conductor 12 decreases, and symmetry of the positions of the conductors 12 in the twisted wire pair 10 is improved. As a result, the transmission characteristics of the communication cable 1, particularly, the mode conversion characteristics can be improved. Each insulated wire 11 preferably has an eccentricity ratio of 65% or more, and more preferably 75% or more, for example. The eccentricity ratio is calculated using the following expression:

[minimum insulation thickness]/[maximum insulation thickness]×100%.

(3-3) Twist Structure of Twisted Wire Pair

The difference in length (wire length difference) between the two insulated wires 11 constituting the twisted wire pair 10 is preferably small. If the difference is small, symmetry of the two insulated wires 11 can be improved in the twisted wire pair 10, and the transmission characteristics, particularly, the mode conversion characteristics can be improved. It is easy to suppress the influence of the wire length difference if the wire length difference per 1 m of the twisted wire pair is 5 mm or less, and more preferably 3 mm or less, for example.

The twist pitch of the twisted wire pair 10 is not specifically limited and can be set according to the outer diameter of each insulated wire 11, for example. Loosening of the twist structure can be effectively suppressed by setting the twist pitch at 60 times or less of the outer diameter of the insulated wire 11, more preferably 45 times or less, and further preferably 30 times or less. Loosening of the twist structure may cause variation or temporal changes in various transmission characteristics such as the characteristic impedance of the communication cable 1.

On the other hand, an excessively small twist pitch of the twisted wire pair 10 reduces productivity of the twisted wire pair 10 and increases the production cost, and therefore the twist pitch is preferably 8 times or more of the outer diameter of the insulated wire 11, more preferably 12 times or more, and further preferably 15 times or more. As described above, if the conductor 12 of the insulated wire 11 has a high breaking elongation, the insulated wire 11 is soft, and therefore it is easy to stably maintain the twist structure of the twisted wire pair 10 without loosening. For example, if the conductor 12 has a breaking elongation of 7% or more, the gap between the insulated wires 11 can be kept small and the characteristic impedance of the communication cable 1 can be stably maintained and kept from becoming too high relative to a required range, such as $100\pm10\Omega$, even if the twisted wire pair 10 has a large twist pitch such as 15 times or more of the outer diameter of the insulated wire 11.

Conversely, if the conductor 12 of the insulated wire 11 has a low breaking elongation, it is possible to compensate for the low breaking elongation by reducing the twist pitch of the twisted wire pair 10 to stably maintain the twist structure of the twisted wire pair 10 in a state where the gap between the insulated wires 11 is small. For example, even if the breaking elongation of the conductor 12 is less than 7%, the characteristic impedance of the communication cable 1 can be stably maintained and kept from becoming too high relative to a required range, such as $100\pm10\Omega$, by reducing the twist pitch of the twisted wire pair to 25 times or less of the outer diameter of the insulated wire 11, or further to 20 times or less, or 15 times or less.

First Variation: Solid Jacket-Type Sheath

In the communication cable 1 of FIG. 1 described above in detail, the sheath 30 has the configuration of a loose jacket. Although the loose jacket-type sheath 30 is preferably used from the standpoint of reducing the diameter and weight of the communication cable 1, if the demand for the reduction in the diameter is not so strong, it is possible to consider using a solid jacket-type sheath 30A of a communication cable 1A according to a first variation described below. Note that the configuration of the communication cable 1A is similar to that of the above-described communication cable 1 in all aspects other than the shape of the sheath 30A.

Figure 2:
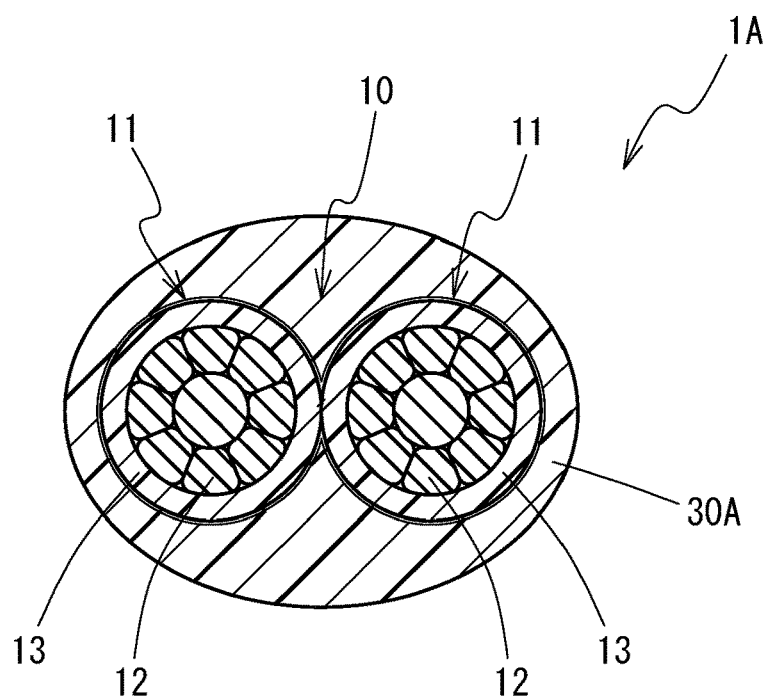
FIG. 2 is a cross-sectional view of a communication cable according to a first variation, in which a sheath is provided as a solid jacket.

FIG. 2 illustrates a cross section of the communication cable 1A according to the first variation. The communication cable 1A includes the solid jacket-type sheath 30A that covers the outer periphery of the twisted wire pair 10. The sheath 30A has a solid structure and is in contact with or is located at a position very close to the insulated wires 11 constituting the twisted wire pair 10, and there is substantially no void between the sheath 30A and the insulated wires 11 other than a void that is inevitably formed during production.

The solid jacket-type sheath 30A is made of a material similar to the above-described material of the loose jacket-type sheath 30, that is, a material that has a dielectric loss tangent of 0.0001 or more and optionally has various preferable properties described above.

If the solid jacket-type sheath 30A is used, it is difficult to reduce the diameter and weight of the communication cable 1A compared to a case where the loose jacket-type sheath 30 is used. However, if the solid jacket-type sheath 30A is used, dielectric loss increases by the effect of the thickness of the dielectric, and therefore common mode noise caused by coupling between the twisted wire pair 10 and the ground potential outside the communication cable 1A can be effectively attenuated. Further, compared to the loose jacket-type sheath 30, the solid jacket-type sheath 30A can firmly fix the twisted wire pair 10 inside it because the solid jacket-type sheath has the solid structure and is in contact with or is located at a position very close to the insulated wires 11. Therefore, phenomena such as displacement of the twisted wire pair 10 relative to the sheath 30A and loosening of the twist structure can be easily prevented. As a result, it is possible to effectively suppress temporal change and variation in various transmission characteristics of the communication cable 1A, which would otherwise be caused by displacement of the twisted wire pair 10 and loosening of the twist structure. Whether the sheath is formed as the loose jacket-type sheath 30 or the solid jacket-type sheath 30A and the thickness of each of the sheaths 30 and 30A can be controlled by changing the conditions (shape of the die and the point, extrusion temperature, and the like) when the sheath is formed through extrusion.

Similarly to the case of the loose jacket-type sheath 30, the polymer material of the solid jacket-type sheath 30A may be foamed or not foamed, but the polymer material of the solid jacket-type sheath 30A is preferably foamed. This is because if air is held in foamed portions, the sheath can have both the effect of reducing the effective dielectric constant of the communication cable 1A and the effect of firmly holding the twisted wire pair 10 inside the solid structure.

Second Variation: Sheath Constituted by Two Layers

In the communication cable 1 of FIG. 1 described above in detail, the loose jacket-type sheath 30 is constituted by a single layer. It is preferable to constitute the sheath 30 by a single layer from the standpoint of simplification of the configuration and convenience in the production process, but if the sheath is constituted by two or more layers, it is possible to set physical properties such as dielectric characteristics for each of the layers and to select specific materials to achieve those physical properties. As a result, the sheath as a whole can have various characteristics and functions.

Figure 3:
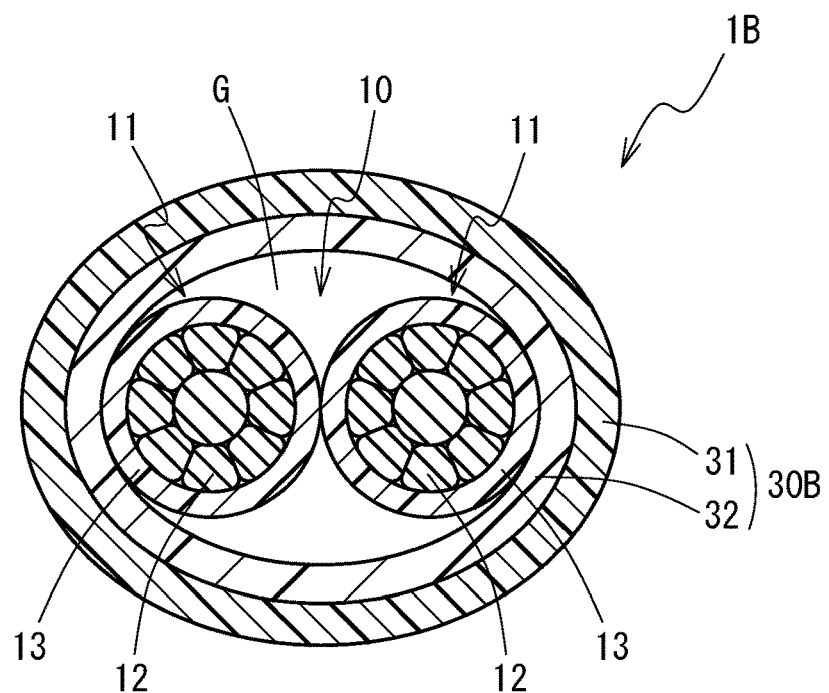
FIG. 3 is a cross-sectional view of a communication cable according to a second variation, in which a sheath is constituted by two layers.

FIG. 3 illustrates a cross section of a communication cable 1B according to a second variation. The communication cable 1B includes a sheath 30B that is constituted by two layers, that is, an outer layer 31 and an inner layer 32 disposed inside the outer layer. Note that the configuration of the communication cable 1B is similar to that of the above-described communication cable 1 in all aspects other than the configuration of the sheath 30B.

The sheath 30B is constituted by the inner layer 32 that covers the outer periphery of the twisted wire pair 10 and the outer layer 31 that coaxially covers the outer side of the inner layer 32. The outer layer 31 and the inner layer 32 are in close contact with each other. There is a void G between the inner layer 32 and the insulated wires 11 constituting the twisted wire pair 10, and the overall sheath 30B including the outer layer 31 and the inner layer 32 has the structure of a loose jacket.

Physical properties of materials of the outer layer 31 and the inner layer 32 are appropriately set according to the purpose, and specific materials are selected for the respective layers 31 and 32 so that the layers have those physical properties. In a preferable example, the dielectric loss tangent of the outer layer 31 is set larger than the dielectric loss tangent of the inner layer 32.

The use of a material having a large dielectric loss tangent as a sheath material that surrounds the twisted wire pair 10 has an excellent effect to improve the mode conversion characteristics by attenuating common mode noise caused by coupling between the twisted wire pair 10 and the ground potential of the surrounding. On the other hand, if the sheath material has a large dielectric loss tangent, differential signals transmitted through the twisted wire pair 10 tend to be attenuated and communication failure may be caused. Therefore, the dielectric loss tangent of the sheath material is preferably small from the standpoint of reducing loss in transmission of signals.

If a material that has a large dielectric loss tangent is used for the outer layer 31, which is located further away from the twisted wire pair 10 among the two layers of the sheath 30B of the present variation, the mode conversion characteristics can be improved by effectively attenuating noise caused by coupling with the outside, while attenuation of signals transmitted through the twisted wire pair 10 being suppressed. On the other hand, attenuation of signals can be suppressed if a material that has a small dielectric loss tangent is used for the inner layer 32 that is located closer to the twisted wire pair 10 and is likely to cause attenuation of signals if it has a large dielectric loss tangent.

A difference in dielectric loss tangent between the outer layer 31 and the inner layer 32 can be achieved by using different materials for the respective layers 31 and 32. The difference in dielectric loss tangent can be easily achieved by using different polymer materials as main components of the respective layers 31 and 32. For example, a polymer material that has a larger molecular polarity than the inner layer 32 is used for the outer layer 31. In a specific example, the outer layer 31 is made of a polymer material that contains a halogen atom, such as polyvinyl chloride, and the inner layer 32 is made of polyolefin such as polypropylene.

The type and amount of filler added to the outer layer 31 and the inner layer 32 may be changed to achieve a difference in dielectric loss tangent between these layers. As shown in the Examples below, the dielectric loss tangent of an insulating material can be changed over a wide range by changing the addition amount of filler.

As the difference in dielectric loss tangent between the outer layer 31 and the inner layer 32 increases, the functions of the respective layers become more apparent. However, if the difference in dielectric loss tangent is too large, serious signal attenuation may be caused by the influence of the outer layer 31 or, to the contrary, a noise attenuation effect of the inner layer 32 may be reduced too much and the sheath 30B as a whole may fail to have a sufficient noise reducing function. The dielectric loss tangent of the outer layer 31 is preferably 3 times or more and 800 times or less of the dielectric loss tangent of the inner layer 32, for example. Specifically, the dielectric loss tangent of the outer layer 31 is 0.0006 to 0.08 and the dielectric loss tangent of the inner layer 32 is 0.0006 to 0.001, for example. Further, the ratio between the thickness of the outer layer 31 and the thickness of the inner layer 32 is preferably 1:3 to 3:1 (outer layer:inner layer).

Although the dielectric loss tangent of the sheath is defined as 0.0001 or more in the present disclosure, in the case of the sheath 30B of the communication cable 1B according to the present variation, at least the dielectric loss tangent of the outer layer 31 is set to 0.0001 or more. It is more preferable that an average value of dielectric loss tangents of the outer layer 31 and the inner layer 32 weighted with their thicknesses is 0.0001 or more, and it is further preferable that each of the outer layer 31 and the inner layer 32 has a dielectric loss tangent of 0.0001 or more.

Although the above-described sheath 30B is a loose jacket-type sheath constituted by two layers, the number of layers constituting the sheath 30B is not limited to two. The sheath may also include three or more layers that are arranged in order of their dielectric loss tangents such that the dielectric loss tangent increases from the inner side toward the outer side, for example. Also, the sheath 30B may be a solid jacket-type sheath like the sheath 30A in the first variation. In this case, the inner layer 32 is configured to have a solid structure and be in contact with or be located at a position very close to the insulated wires 11.

Third Variation: Fused Twisted Wire Pair

In the communication cable 1 of FIG. 1 described above in detail, the two insulated wires 11 constituting the twisted wire pair 10 are merely twisted together and are not joined together. In contrast, in a communication cable 1C according to a third variation, which has a cross section illustrated in FIG. 4, the insulating coverings 13 of the two insulated wires 11 constituting a twisted wire pair 10C are fused (or bonded; the same applies hereinafter) together in the entire region or a part of the region in the longitudinal direction. Note that the configuration of the communication cable 1C is similar to that of the above-described communication cable 1 in all aspects other than the configuration of the twisted wire pair 10C.

Figure 4:
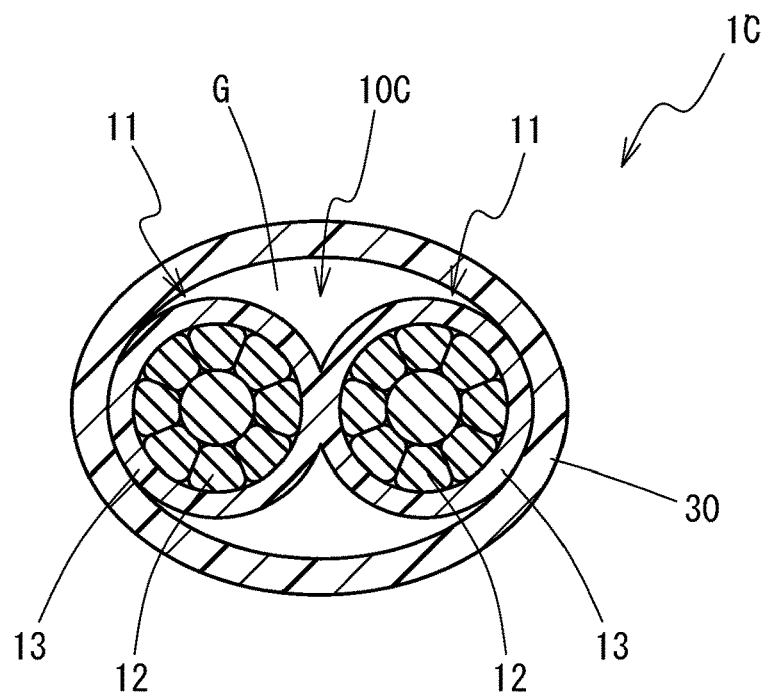
FIG. 4 is a cross-sectional view of a communication cable according to a third variation, in which insulating coverings of insulated wires are fused.

As illustrated in FIG. 4, the insulating coverings 13 of the two insulated wires 11 of the twisted wire pair 10C are fused and united with each other in a region where the insulated wires 11 are closest to each other. As a result, the twisted wire pair 10C has a cross-sectional shape resembling eyeglasses.

As a result of the two insulated wires 11 constituting the twisted wire pair 10C being fixed relative to each other, the balance between the positions of the two insulated wires 11 is improved. Consequently, the transmission characteristics such as the mode conversion characteristics of the communication cable 1 are improved and stabilized.

For example, an adhesive layer is formed on each insulating covering 13 to fuse the insulating coverings 13 of the two insulated wires 11. The above-described twisted wire pair 10C may be used in combination with any of the above-described sheaths 30, 30A, and 30B to constitute a communication cable.

EXAMPLES

The following describes examples of the present disclosure. Note that the present disclosure is not limited by these examples. Various evaluations in the examples were performed at room temperature in the atmosphere.

[1] Dielectric Loss Tangent and Mode Conversion Characteristics

First, the influence of the dielectric loss tangent of the sheath on mode conversion characteristics and the influence of the relationship between the dielectric loss tangent of the sheath and the dielectric loss tangent of the insulating covering were verified.

Production of Samples (1) Preparation of Insulating Materials

As materials of the sheath of the communication cable and the insulating covering of the insulated wire, insulating materials A to D were prepared by kneading components shown in Table 1 below. Magnesium hydroxide was used as a flame retardant and a hindered phenol-based antioxidant was used as an antioxidant.

(2) Production of Conductor

A conductor of an insulated wire was produced. Specifically, a mixed molten metal was prepared by introducing an electrolytic copper with at least 99.99% purity and a master alloy containing Fe and Ti into a crucible made of highly pure carbon and subjecting the mixture to vacuum melting. The mixed molten metal contained 1.0% by mass of Fe and 0.4% by mass of Ti. The obtained mixed molten metal was subjected to continuous casting to form a cast material having a diameter of ø12.5 mm. The obtained cast material was extruded and rolled to ø8 mm and then drawn to ø0.165 mm. Seven strands each obtained as described above were twisted together at a twist pitch of 14 mm and were subjected to compression molding. Thereafter, thermal treatment was performed. The thermal treatment was performed at a temperature of 500° C. for 8 hours. The resultant conductor had a cross-sectional area of 0.13 mm$^2$ and an outer diameter of 0.45 mm.

The thus obtained copper alloy conductor was evaluated for its tensile strength and breaking elongation according to JIS Z 2241. The gauge length was 250 mm and the tensile speed was 50 mm/min. Evaluation results were a tensile strength of 490 MPa and a breaking elongation of 8%.

(3) Production of Insulated Wire

Insulated wires used in samples 1 to 10 were each produced by forming an insulating covering on an outer periphery of the produced copper alloy conductor through extrusion. In samples 1 to 4, the insulating material B was used as the insulating material of the insulating covering. In samples 5 to 10, the insulating materials shown in Table 3 were used. The thickness of the insulating covering was 0.20 mm. The eccentricity ratio of the insulated wire was 80%.

(4) Production of Communication Cable

A twisted wire pair was obtained by twisting together two insulated wires each produced as described above at a twist pitch of 24 times of the outer diameter of the insulated wire. Twirling about the twist axis was not added to the insulated wires during twisting. Then, a sheath was formed by extruding an insulating material to surround an outer periphery of the obtained twisted wire pair.

The insulating material of the sheath was selected from the insulating materials A to D shown in Table 2 for samples 1 to 4 and in Table 3 for samples 5 to 10. In the thus obtained communication cables of samples 1 to 4, the insulating covering of the insulated wire was made of the insulating material B and the sheath was made of the insulating materials A to D, respectively. In samples 5 to 10, the insulating covering of the insulated wire and the sheath were made of combinations of the insulating materials B to D.

The sheath was formed as a loose jacket-type sheath having a thickness of 0.4 mm. The outer peripheral area ratio of the void between the sheath and the insulated wires was 23%, and adhesive power of the sheath with respect to the insulated wires (i.e., strength measured when pulling the twisted wire pair out of a communication cable having an entire length of 150 mm in a state where the sheath was removed by a length of 30 mm from one end, until the twisted wire pair was removed) was 15 N. Thus, the communication cables of samples 1 to 4 and samples 5 to 10 were obtained.

The characteristic impedance was measured for each of the communication cables of samples 1 to 10 using an LCR meter by an open-short method, and it was found that the characteristic impedance was in a range of 100±10Ω in all of samples 1 to 10.

Evaluation

First, the dielectric loss tangent of each of the insulating materials A to D was measured. The measurement was performed using an impedance analyzer.

Next, the transmission mode conversion characteristic (LCTL) was evaluated for samples 1 to 4 that differ from each other in the material of the sheath and accordingly differ in dielectric loss tangent of the sheath. The measurement was performed using a network analyzer at a frequency of 50 MHz.

Further, the transmission mode conversion characteristic was similarly evaluated for samples 5 to 10 that differ from each other in their combination of materials of the sheath and the insulating covering and accordingly differ in their combination of dielectric loss tangents of the sheath and the insulating covering.

Results

Table 1 shows measurement results of the dielectric loss tangent of the insulating materials A to D together with blend ratio of constituent materials.

TABLE 1

| Material | Constituent material blend ratio [parts by mass] | | | | Dielectric loss tangent |
|---|---|---|---|---|---|
| | Polypropylene resin | Flame retardant | Anti-oxidant | Styrene-based elastomer | |
| Insulating material A | 100 | 20 | 2 | 10 | 0.0001 |
| Insulating material B | | 60 | | | 0.0002 |
| Insulating material C | | 120 | | | 0.0006 |
| Insulating material D | | 180 | | | 0.001 |

Table 1 shows that the dielectric loss tangent increases with an increase in the amount of filler.

Table 2 shows measurement results of the transmission mode conversion characteristic of the communication cables of samples 1 to 4 in which the sheath was formed using the above-described insulating materials A to D, respectively.

TABLE 2

| Sample No. | Insulating covering | | Sheath | | Transmission mode conversion [dB] |
|---|---|---|---|---|---|
| | Material | Dielectric loss tangent | Material | Dielectric loss tangent | |
| Sample 1 | Insulating material B | 0.0002 | Insulating material A | 0.0001 | 46 |
| Sample 2 | | | Insulating material B | 0.0002 | 47 |
| Sample 3 | | | Insulating material C | 0.0006 | 53 |
| Sample 4 | | | Insulating material D | 0.001 | 56 |

Table 2 shows that transmission mode conversion satisfying the level of 46 dB or more was achieved with dielectric loss tangents of the sheath of 0.0001 or more. The value of transmission mode conversion increases with an increase in the dielectric loss tangent of the sheath.

Table 3 shows measurement results of the transmission mode conversion characteristic of samples 5 to 10 that differ from each other in their combination of materials of the sheath and the insulating covering and accordingly differ in their combination of dielectric loss tangents of the sheath and the insulating covering.

TABLE 3

| Sample No. | Insulating covering | | Sheath | | Transmission mode conversion [dB] |
|---|---|---|---|---|---|
| | Material | Dielectric loss tangent | Material | Dielectric loss tangent | |
| Sample 5 | Insulating material B | 0.0002 | Insulating material B | 0.0002 | 47 |
| Sample 6 | Insulating material B | 0.0002 | Insulating material D | 0.001 | 56 |
| Sample 7 | Insulating material C | 0.0006 | Insulating material B | 0.0002 | 44 |
| Sample 8 | Insulating material C | 0.0006 | Insulating material D | 0.001 | 53 |
| Sample 9 | Insulating material D | 0.001 | Insulating material B | 0.0002 | 43 |
| Sample 10 | Insulating material D | 0.001 | Insulating material D | 0.001 | 49 |

The results in Table 3 show that the value of transmission mode conversion was smaller than 46 dB in samples 7 and 9 in which the dielectric loss tangent of the sheath was smaller than the dielectric loss tangent of the insulating covering. In contrast, the value of transmission mode conversion was 46 dB or more in samples 5 and 10 in which the dielectric loss tangent of the sheath was the same as the dielectric loss tangent of the insulating covering. In samples 6 and 8 in which the dielectric loss tangent of the sheath was larger than the dielectric loss tangent of the insulating covering, the value of transmission mode conversion was further increased and exceeded 50 dB. In comparison between samples 6 and 8, the value of transmission mode conversion was larger in sample 6, which had a larger difference in dielectric loss tangent between the sheath and the insulating covering.

[2] Influence of Tensile Strength of Conductor

Next, it was verified whether the tensile strength of the conductor of the insulated wire affects mode conversion characteristics of the communication cable.

Production of Samples

Communication cables of samples 11 to 13 were produced similarly to those in the above-described experiment [1]. However, amounts of Fe and Ti in the component composition of the conductor were varied between the samples as shown in Table 4 below. The insulating covering of the conductor was formed using the above-described insulating material B and the sheath was formed using the above-described insulating material D. Sample 11 is the same as sample 6 in the above-described experiment [1].

Evaluation

The transmission mode conversion characteristic (LCTL) was evaluated for each of the communication cables of samples 11 to 13. Measurement was performed using a network analyzer at a frequency of 50 MHz.

Further, the copper alloy conductor of each sample was evaluated for its tensile strength and breaking elongation according to JIS Z 2241. The gauge length was 250 mm and the tensile speed was 50 mm/min. Further, the characteristic impedance of the communication cable was measured using an LCR meter by the open-short method, and it was found that the characteristic impedance was in a range of 100±10Ω in all of samples 11 to 13.

Results

Table 4 shows evaluation results of transmission mode conversion in samples 11 to 13 together with the component composition and properties of the conductor.

TABLE 4

| Sample No. | Conductor composition (% by mass) | | Properties of conductor | | Transmission mode conversion [dB] |
|---|---|---|---|---|---|
| | Fe | Ti | Tensile strength (MPa) | Breaking elongation (%) | |
| Sample 11 | 1.0 | 0.40 | 490 | 8 | 56 |
| Sample 12 | 1.0 | 0.22 | 425 | 8 | 55 |
| Sample 13 | 1.0 | 0.16 | 380 | 8 | 56 |

Table 4 shows that the tensile strength changed by a change in the component composition of the conductor. Specifically, with an increase in the amount of Ti, the tensile strength was improved while the breaking elongation was maintained. However, the value of transmission mode conversion of the communication cable did not substantially change even though the tensile strength of the conductor changed.

These results confirm that a change in the tensile strength of the conductor has no influence on electrical characteristics such as the mode conversion characteristics of the communication cable if the communication cable can be produced by properly selecting configurations such as the cross-sectional area of the conductor.

[3] Relationship Between Breaking Elongation of Conductor and Twist Pitch

Next, the relationship between the breaking elongation of the conductor and the twist pitch of the twisted wire pair was verified.

Production of Samples (1) Preparation of Insulating Materials

A material of the sheath of the communication cable was prepared by kneading 100 parts by mass of a polypropylene resin and 60 parts by mass of magnesium hydroxide added as a flame retardant. The dielectric loss tangent of this material was 0.0002. Also, a material of the insulating covering of the insulated wire was prepared by kneading 100 parts by mass of a polypropylene resin and 120 parts by mass of magnesium hydroxide added as a flame retardant. The dielectric loss tangent of this material was 0.0006.

(2) Production of Conductor

Two types of conductors were prepared in this experiment. A conductor for samples of groups A1 to A3 was prepared using a Cu—Fe—P—Sn alloy wire, which is a soft copper wire. Specifically, a mixed molten metal was prepared by introducing an electrolytic copper with at least 99.99% purity and a master alloy containing Fe, P, and Sn into a crucible made of highly pure carbon and subjecting the mixture to vacuum melting. The mixed molten metal contained 0.61% by mass of Fe, 0.12% by mass of P, and 0.26% by mass of Sn. The obtained mixed molten metal was subjected to continuous casting to form a cast material having a diameter of ø12.5 mm. The obtained cast material was extruded and rolled to ø8 mm and then drawn to ø0.165 mm. Seven strands each obtained as described above were twisted together at a twist pitch of 14 mm and were subjected to compression molding. Thereafter, thermal treatment was performed. The thermal treatment was performed at a temperature of 480° C. for 4 hours. The resultant conductor had a cross-sectional area of 0.13 mm$^2$ and an outer diameter of 0.45 mm. This conductor had a breaking elongation of 7%.

On the other hand, a conductor for samples of groups B1 to B3 was prepared using a Cu—Sn alloy wire, which is a hard copper wire. The Cu—Sn alloy contained 0.24% by mass of Sn and the remaining portion was Cu and inevitable impurities. The conductor was prepared similarly to the above-described case of the Cu—Fe—P—Sn alloy wire by twisting together seven strands of ø0.165 mm at a twist pitch of 14 mm and subjecting the resultant twisted wire to compression molding. The obtained conductor had a cross-sectional area of 0.13 mm$^2$ and an outer diameter of 0.45 mm. The conductor had a breaking elongation of 2%.

(3) Production of Insulated Wire

Similarly to the experiment [1], insulated wires used for samples of groups A1 to A3 and groups B1 to B3 were produced by forming insulating coverings with a thickness of 0.20 mm through extrusion on outer peripheries of the two types of copper alloy conductors using the insulating material prepared as described above. Each insulated wire had an outer diameter of 0.85 mm.

(4) Production of Communication Cable

A twisted pair wire was obtained by twisting together two insulated wires each produced as described above. The twist pitch was any of the three twist pitches shown in Table 5. No twirling about the twist axis was added to the insulated wires during twisting.

Then, similarly to the above-described experiment [1], a sheath was formed by extruding the insulating material prepared as described above. The sheath was formed as a loose jacket-type sheath having a thickness of 0.4 mm. Thus, communication cables of groups A1 to A3 and groups B1 to B3 were obtained.

The conductors of the communication cables of groups A1 to A3 were constituted by soft copper wires and the conductors of the communication cables of groups B1 to B3 were constituted by hard copper wires. The twist pitch of the twisted wire pair relative to the outer diameter of the insulated wire was 18 times in groups A1 and B1, 24 times in groups A2 and B2, and 29 times in groups A3 and B3.

Evaluation

The characteristic impedance was measured for each of the obtained communication cables. The measurement was performed using an LCR meter by the open-short method. Five communication cables were prepared as samples (sample Nos. #1 to #5) for each of the groups A1 to A3 and groups B1 to B3, and the characteristic impedance of each sample was measured to evaluate variation between the samples.

Results

Table 5 shows measurement results of the characteristic impedance of the communication cables of each of the groups A1 to A3 and groups B to B3. The average value of characteristic impedances of five samples and a distribution width calculated as the difference between the maximum value and the minimum value are also shown. In the table, the twist pitch of the twisted wire pair is shown as a multiple of the outer diameter of the insulated wire.

TABLE 5

| Group No. | Twist pitch (relative to wire diameter) | Conductor type | Characteristic impedance (Ω) | | | | | | |
|---|---|---|---|---|---|---|---|---|---|
| | | | #1 | #2 | #3 | #4 | #5 | Average | Distribution width |
| A1 | 18 times | Soft copper wire | 102 | 100 | 101 | 99 | 102 | 101 | 3 |
| B1 | | Hard copper wire | 103 | 105 | 101 | 100 | 103 | 102 | 5 |
| A2 | 24 times | Soft copper wire | 102 | 103 | 105 | 103 | 101 | 103 | 4 |
| B2 | | Hard copper wire | 102 | 108 | 104 | 103 | 111 | 106 | 9 |
| A3 | 29 times | Soft copper wire | 103 | 102 | 104 | 104 | 106 | 104 | 4 |
| B3 | | Hard copper wire | 103 | 106 | 110 | 104 | 112 | 107 | 9 |

Table 5 shows that, at each of the twist pitches, the average value and distribution width of the characteristic impedance were smaller when the soft copper wire having a high breaking elongation was used as the conductor than when the hard copper wire having a low breaking elongation was used. That is, a state where the characteristic impedance was not too high was stably achieved in the case where the soft copper wire was used as the conductor. This is interpreted as the result of the two insulated wires being stably twisted together with a small gap because the conductor had a high breaking elongation.

In the case where the soft copper wire was used as the conductor, values of the characteristic impedance fell in the range of 100±10Ω with a margin being left even when the twist pitch was as large as 29 times of the outer diameter of the insulated wire. On the other hand, the above results are interpreted to mean that, even if the hard copper wire is used as the conductor, a characteristic impedance in the range of 100±10Ω can be achieved by reducing the twist pitch to less than 24 times of the outer diameter of the insulated wire.

Although an embodiment of the present disclosure has been described in detail, the present disclosure is by no means limited to the above-described embodiment, and various alterations can be made within a scope not departing from the gist of the present disclosure.

The invention claimed is:

1. A communication cable comprising:
   a twisted wire pair that includes a pair of insulated wires that are twisted together and that each include a conductor and an insulating covering that covers an outer periphery of the conductor; and
   a sheath that is made of an insulating material and continuously covers an entire outer periphery of the twisted wire pair about a center along a longitudinal axis of the twisted wire pair, wherein
   the twisted wire pair covered by the sheath is only one twisted wire pair, and the sheath continuously covers the entire outer periphery of the only one twisted wire pair,
   the insulating covering includes only one layer, the one layer having a smaller dielectric loss tangent than the sheath has in a frequency range of 1 to 50 MHz, and
   the sheath has a dielectric loss tangent of 0.0001 or more in the frequency range of 1 to 50 MHz,
   the conductor has a breaking elongation of 7% or more and a twist pitch of the twisted wire pair is 15 times or more of an outer diameter of each of the insulated wires, or
   the conductor has a breaking elongation of less than 7% and a twist pitch of the twisted wire pair is 25 times or leas of the outer diameter of each of the insulated wires.

2. The communication cable according to claim 1, wherein the dielectric loss tangent of the sheath is 0.08 or less in the frequency range of 1 to 50 MHz.

3. The communication cable according to claim 1, wherein the sheath includes an outer layer and an inner layer that is disposed inside the outer layer, and a dielectric loss tangent of the outer layer is larger than a dielectric loss tangent of the inner layer.

4. The communication cable according to claim 1, wherein the insulating covering has a dielectric loss tangent of 0.001 or less in the frequency range of 1 to 50 MHz.

5. The communication cable according to claim 1, wherein the insulating covering has a dielectric loss tangent of 0.0006 or less in the frequency range of 1 to 50 MHz.

* * * * *